US012398850B1

(12) United States Patent
Yao

(10) Patent No.: US 12,398,850 B1
(45) Date of Patent: Aug. 26, 2025

(54) LED-EMBEDDED LIGHT-EMITTING WIRE LIGHT STRING

(71) Applicant: ShenZhen Jin Chang Da Nonferrous Metals Co., Ltd., Guangdong (CN)

(72) Inventor: Benyi Yao, Guangdong (CN)

(73) Assignee: ShenZhen Jin Chang Da Nonferrous Metals Co., Ltd., Shenzhen (CN)

( * ) Notice: Subject to any disclaimer, the term of this patent is extended or adjusted under 35 U.S.C. 154(b) by 0 days.

(21) Appl. No.: 18/795,068

(22) Filed: Aug. 5, 2024

(30) Foreign Application Priority Data

May 24, 2024 (CN) ......................... 202421155702.2

(51) Int. Cl.

| | |
|---|---|
| ***F21S 4/10*** | (2016.01) |
| ***F21V 23/00*** | (2015.01) |
| ***F21V 23/06*** | (2006.01) |
| *F21Y 103/00* | (2016.01) |
| *F21Y 113/00* | (2016.01) |
| *F21Y 115/10* | (2016.01) |

(52) U.S. Cl.
CPC .............. *F21S 4/10* (2016.01); *F21V 23/001* (2013.01); *F21V 23/06* (2013.01); *F21Y 2103/00* (2013.01); *F21Y 2113/00* (2013.01); *F21Y 2115/10* (2016.08)

(58) Field of Classification Search
CPC ........... F21V 23/001; F21V 23/06; F21S 4/10
See application file for complete search history.

(56) References Cited

U.S. PATENT DOCUMENTS

| | | | | |
|---|---|---|---|---|
| 11,466,822 | B1 * | 10/2022 | Xia | F21S 10/02 |
| 2009/0085487 | A1 * | 4/2009 | Braasch | F21S 4/10<br>315/185 S |
| 2018/0172226 | A1 * | 6/2018 | Zhao | F21S 4/20 |

* cited by examiner

*Primary Examiner* — Abdulmajeed Aziz
*Assistant Examiner* — Nathaniel J Lee

(57) ABSTRACT

An LED-embedded light-emitting wire light string is provided, including a plug, a tail socket, a main wire, tees, injection-molded lamp bases, light bulbs, and a rectifier drive board. Two ends of the main wire are respectively connected to the plug and the tail socket; branches are provided on the main wire, each branch is connected to one of the injection-molded lamp bases by way of the corresponding tee unit, the light bulbs are respectively installed on the injection-molded lamp bases, and the main wire also connects a plurality of light bulbs in series to form a high-voltage wire lamp; a plurality of LED beads are connected in series on the main wire so as to form a low-voltage wire lamp; the low-voltage wire lamp is connected to the plug or the tail socket; and the high-voltage wire lamp and the low-voltage wire lamp share a power supply.

18 Claims, 4 Drawing Sheets

LED-EMBEDDED LIGHT-EMITTING WIRE LIGHT STRING

CROSS-REFERENCE TO RELATED APPLICATIONS

This application claims priority of Chinese Patent Application No. 202421155702.2, filed on May 24, 2024, the entire contents of which are incorporated herein by reference.

TECHNICAL FIELD

The present disclosure relates to an LED light string, and in particular to an LED-embedded light-emitting wire light string.

BACKGROUND

An LED light string includes a strip body, and LED lights integrated on the strip body. Low-voltage light strings are powered by low-voltage power supplies; and for example, common portable mobile power supplies are used for supplying power for the light strings, making it convenient and flexible to use. A low-voltage battery light string includes an LED light string, a control box, and a mobile power supply which are electrically connected in turn, and a power driver adapted to the LED light string is placed inside the control box.

The existing low-voltage light string products have the defects such as short series connection distance, severe voltage drop, and inconsistent brightness at the beginning and end.

SUMMARY

The present disclosure designs an LED-embedded light-emitting wire light string, which solves the technical problem of failure in series connection between the traditional low-voltage light strings and high-voltage light strings, and avoids disadvantages of short connection length and severe light attenuation of a first light caused by line loss and voltage drop during use of the low-voltage light string.

In order to solve the above-mentioned technical problem, the present disclosure adopts the following solution.

An LED-embedded light-emitting wire light string includes a plug, a tail socket, a main wire, tees, injection-molded lamp bases, light bulbs, and a rectifier drive board, where two ends of the main wire are respectively connected to the plug and the tail socket; a plurality of branches are provided on the main wire, each of the branches is connected to one of the injection-molded lamp bases by way of the corresponding tee unit, the light bulbs are respectively installed on the injection-molded lamp bases, and the main wire connects a plurality of light bulbs in series to form a high-voltage wire lamp; a plurality of LED lamp beads are also connected in series on the main wire so as to form a low-voltage wire lamp; the low-voltage wire lamp is connected to the plug or the tail socket by way of the rectifier drive board; and the high-voltage wire lamp and the low-voltage wire lamp share a power supply.

Preferably, the main wire is composed of a high-voltage positive pole core wire, a high-voltage negative pole core wire, the low-voltage wire lamp, a light-transmitting film, and a sheath layer; the high-voltage positive pole core wire, the high-voltage negative pole core wire, and the low-voltage wire lamp are twisted into a stranded wire body, and the light-transmitting film is wound around an outside of the stranded wire body; and the light-transmitting film can reflect and refract light for a plurality of times during a propagation process of light, thereby achieving an effect of diffuse reflection and making a light emitted by a wire more uniform.

Preferably, the low-voltage wire lamp is composed of two conductor wires and a plurality of LED lamp beads connected to the two conductor wires; and the LED lamp beads are fixed on the two conductor wires by welding, and a dispensing sticker layer is applied to an outer surface of each of the LED lamp beads, thereby making the LED lamp beads completely sealed, so as to achieve a waterproof effect.

Preferably, the low-voltage wire lamp is a leather wire lamp or a copper wire lamp, and a light emitted by the low-voltage wire lamp is monochromatic or chromatic.

Preferably, the low-voltage wire lamp achieves a flashing or breathing light effect under a control of a rectifier control device.

Preferably, the rectifier drive board is provided with two input solder joints, two output solder joints, two lead wires, and the rectifier control device, where one end of each of the lead wires is welded to one of the input solder joints on the rectifier drive board, and the other end thereof is connected to the plug or the tail socket to use electricity; and each of the output solder joints is connected to one of the conductor wires of the low-voltage wire lamp, so as to supply power to the low-voltage wire lamp.

Preferably, the plug is composed of inserts, a plug inner frame, and rubber masses, where two insert riveting ports are respectively reserved at tail parts of the inserts for connecting the main wire; one of the insert riveting ports allows one of the lead wires to be tightly connected to the high-voltage negative pole core wire and the plug by way of punched riveting, and the other insert riveting port enables the other lead wire, the high-voltage positive pole core wire and the plug to be tightly connected by way of punched riveting; and/or, the tail socket is composed of a tail socket inner frame, a tail socket terminal, and PVC rubber masses; two riveting ports are respectively reserved at a tail end of the tail socket terminal for connecting the main wire; and one of the riveting ports allows one of the lead wires to be tightly connected to the high-voltage negative pole core wire and the tail socket by way of punched riveting, and the other riveting port enables the other lead wire, the high-voltage positive pole core wire and the tail socket to be tightly connected by way of punched riveting.

Preferably, the injection-molded lamp bases are flat-head lamp bases; and alternatively, the injection-molded lamp bases are lamp bases with overhang lines, each of the lamp bases with overhang lines is composed of two suspension wires, riveted terminals, a lamp holder, and a PVC rubber mass, where one end of one of the suspension wires is connected to the lamp holder, and the other end thereof is connected to the high-voltage positive pole core wire in the main wire by way of the respective riveted terminal; one end of the other suspension wire is connected to the lamp holder, and the other end thereof is connected to the high-voltage negative pole core wire in the main line by way of the respective riveted terminal, so that the lamp base is powered on.

Preferably, the tail socket can output 120V AC voltage after being powered on, so as to facilitate a subsequent series connection with other light strings.

Preferably, the light bulbs in the high-voltage wire lamp and the low-voltage wire lamp in the wire can be simultaneously lighted up for emitting light.

The LED-embedded light-emitting wire light string has the following beneficial effects.

The present disclosure can achieve the integration of the low-voltage light string and the high-voltage light string, and also effectively solves the problem of failure in series connection between traditional low-voltage light strings and high-voltage light strings; and furthermore, it also avoids disadvantages of short connection length and severe light attenuation of a first light caused by line loss and voltage drop during use of the low-voltage light string.

According to the present disclosure, a wire-shaped or rope-shaped LED light with an independent power supply is embedded into the wire, so that the wire also has a luminous effect after being powered on; and moreover, a light-transmitting film winding layer is configured to further increase the propagation range of light, thereby creating a good visual effect. On this basis, due to the independent power supply of the wire-shaped or rope-shaped LED light, the lighting effect is more stable, and the defects, such as short series connection distance, severe voltage drop, and inconsistent brightness at the beginning and end, of the existing low-voltage light string products are avoided.

DESCRIPTION OF REFERENCE NUMERALS

1 denotes a plug; 101 denotes inserts; 102 denotes an inner frame; 103 denotes injection-molded bodies of the plug;

2 denotes a tail socket; 201 denotes an inner frame; 202 denotes a terminal; 2021 denotes riveting ports;

3 denotes a main wire; 301 denotes an AC positive pole core wire; 302 denotes an AC negative pole core wire; 303 denotes a low-voltage wire lamp; 3031 denotes LED lamp beads; 3032 denotes conductor wires; 3033 denotes a dispensing sticker layer; 304 denotes a light-transmitting film; 305 denotes a sheath layer; 306 denotes a stranded wire body;

4 denotes tee units; 401 denotes tee injection-molded parts;

5 denotes injection-molded lamp bases; 501 denotes a flat-head lamp base; 502 denotes a lamp base with an overhang line; 5021 denotes suspension wires; 5022 denotes riveted terminals;

6 denotes light bulbs;

7 denotes a rectifier drive board; 701 denotes input solder joints; 702 denotes output solder joints; 703 denotes lead wires; and 704 denotes a rectifier control device.

DETAILED DESCRIPTION

The present disclosure will be further illustrated below in conjunction with FIG. 1 to FIG. 8.

Figure 1:
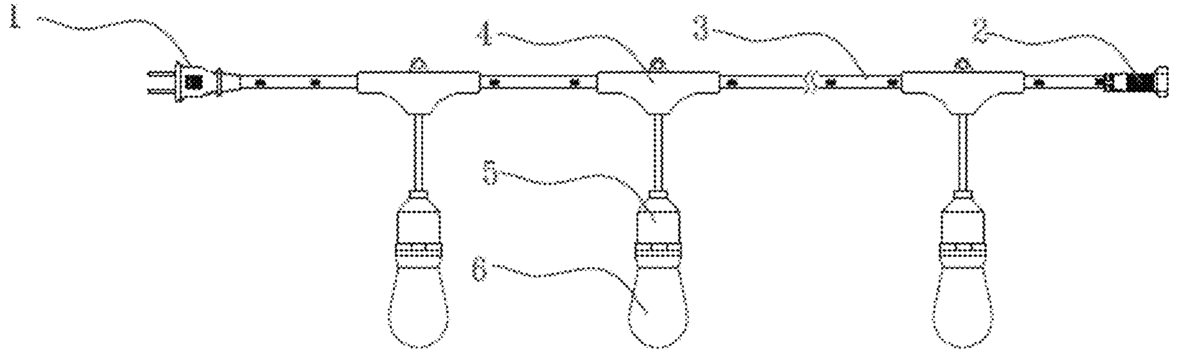
FIG. 1 is a schematic diagram showing the connection of components of an LED-embedded light-emitting wire light string according to the present disclosure.

As shown in FIG. 1, the present disclosure provides an LED-embedded light-emitting wire light string, which includes a plug 1, a tail socket 2, a main wire 3, tees 4, injection-molded lamp bases 5, light bulbs 6, and a rectifier drive board 7 disposed inside the plug 1 or the tail socket 2 by way of injection molding.

Two ends of the main wire 3 are respectively connected to the plug 1 and the tail socket 2; a plurality of branches are equally spaced or unequally spaced in a middle of main wire 3, each of the branches is connected to one of the injection-molded lamp bases 5 by way of the corresponding tee unit 4; and the light bulbs 6 are respectively installed on the injection-molded lamp bases 5, so that all the lamp bases on the entire light string can be powered on. The tee units 4 may be tee injection-molded parts 401.

Figure 2:
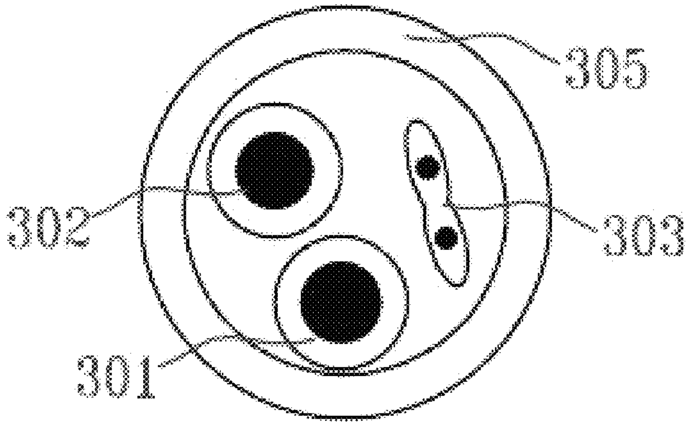
FIG. 2 is a schematic diagram of the radial cross-section of a wire according to the present disclosure.
Figure 3:
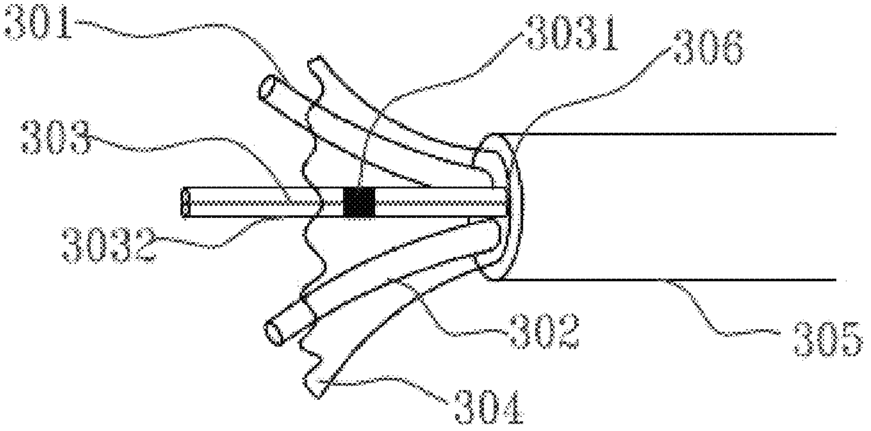
FIG. 3 is a schematic diagram of the structure of the wire according to the present disclosure.

As shown in FIG. 2 and FIG. 3, the main wire 3 is composed of a high-voltage positive pole core wire 301, a high-voltage negative pole core wire 302, a low-voltage wire lamp 303, a light-transmitting film 304, and a sheath layer 305. After the high-voltage positive pole core wire 301, the high-voltage negative pole core wire 302, and the low-voltage wire lamp 303 are twisted into a stranded wire body, the light-transmitting film 304 is evenly wound around an outer layer of the stranded wire body 306; and the light-transmitting film 304 can reflect and refract light for a plurality of times during a propagation process of light, thereby achieving an effect of diffuse reflection and making a light emitted by a wire more uniform.

The low-voltage wire lamp 303 is composed of conductor wires 3032 and LED lamp beads 3031 distributed at equal intervals on the conductor wires; and after the LED lamp beads 3031 are welded on the conductor wires 3032, a dispensing sticker layer 3033 is applied to an outer surface of each of the LED lamp beads, thereby making the LED lamp beads 3031 completely sealed, so s to achieve a waterproof effect.

The low-voltage wire lamp 303 includes, but is not limited to, a leather wire lamp, a copper wire lamp, or other low-voltage LED wire-shaped or rope-shaped lighting products, with color including, but not limited to, monochrome and RGB color.

Figure 4:
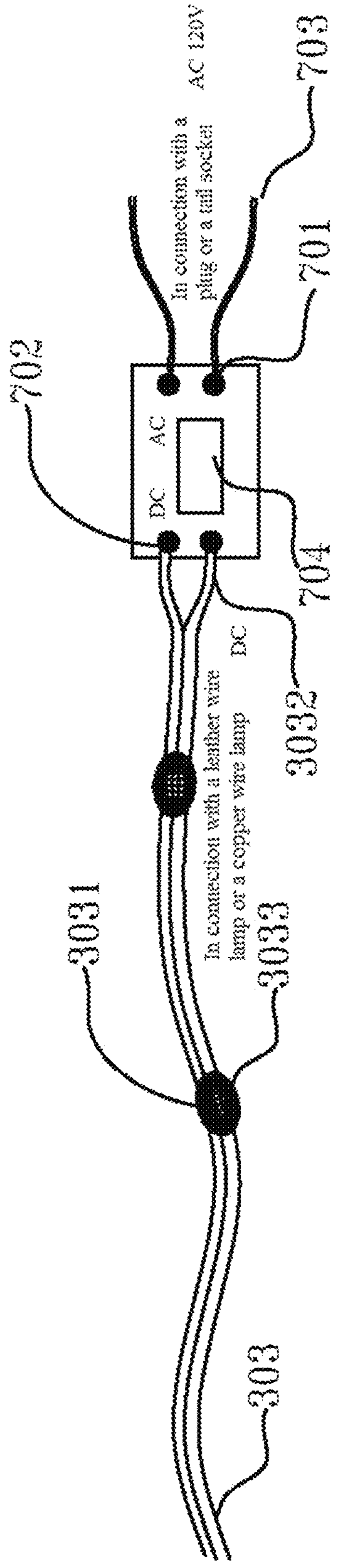
FIG. 4 is a schematic diagram showing the connection between a rectifier drive board and a main line according to the present disclosure.

As shown in FIG. 4, the low-voltage wire lamp 303 is supplied with power through the rectifier drive board 7.

The rectifier drive board 7 is provided with input solder joints 701, output solder joints 702, lead wires 703, and a rectifier control device 704. One end of each of the lead wires 703 is welded to one of the input solder joints 701 on the rectifier drive board 7, and the other end thereof is connected to the plug 1 or the tail socket 2 to use electricity; and each of the output solder joints 702 is connected to one of the conductor wires 3032 of the low-voltage wire lamp, so as to supply power to the low-voltage wire lamp 303.

Figure 5:
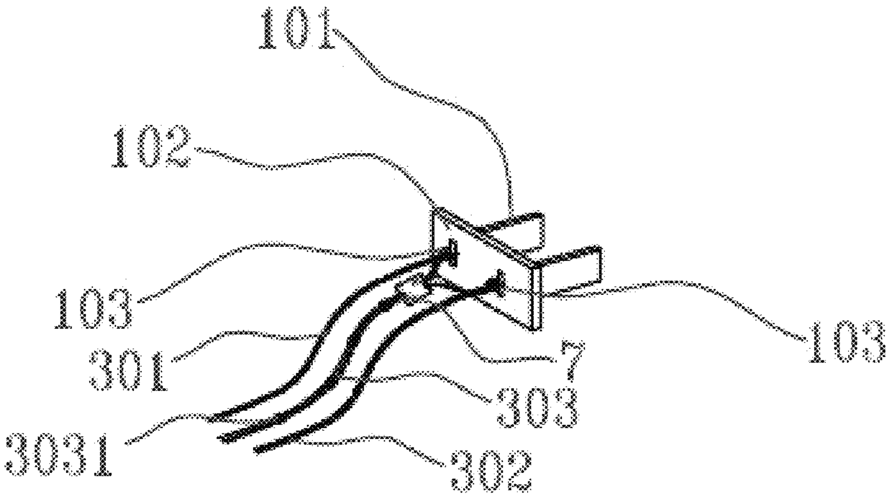
FIG. 5 is a schematic diagram showing the connection between the rectifier drive board and a plug according to the present disclosure.

As shown in FIG. 5, the plug 1 is composed of inserts 101, a plug inner frame 102, and rubber masses 103. Two insert riveting ports are respectively reserved at tail parts of the inserts 101 for connecting the main wire 3; and one of the insert riveting ports allows one of the lead wires 703 to be tightly connected to the high-voltage negative pole core wire

302 and the plug by way of punched riveting, and the other insert riveting port enables the other lead wire 703, the high-voltage positive pole core wire 301 and the plug to be tightly connected by way of punched riveting.

Figure 6:
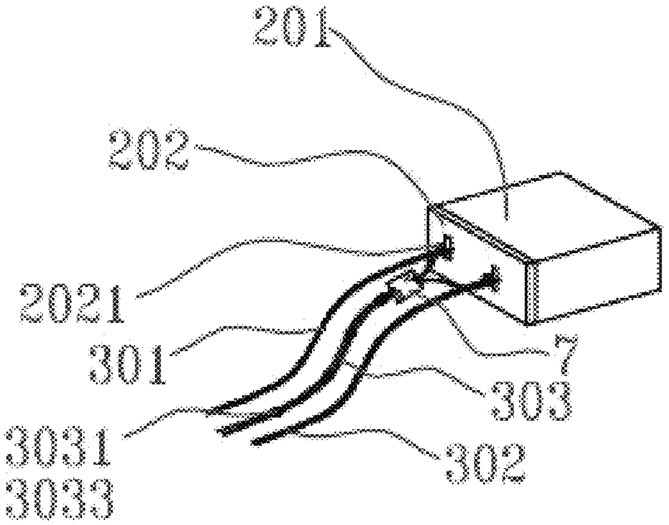
FIG. 6 is a schematic diagram showing the connection between the rectifier drive board and a tail socket according to the present disclosure.

As shown in FIG. 6, the tail socket 2 is composed of a tail socket inner frame 201, a tail socket terminal 202, and PVC rubber masses 203. Two riveting ports 2021 are respectively reserved at a tail end of the tail socket terminal 202 for connecting the main wire 3; and one of the riveting ports 2021 allows one of the lead wires 703 to be tightly connected to the high-voltage negative pole core wire 302 and the tail socket by way of punched riveting, and the other riveting port enables the other lead wire 703, the high-voltage positive pole core wire 301 and the tail socket to be tightly connected by way of punched riveting.

As shown in FIG. 5 and FIG. 6, the lead wires 703 on the rectifier drive board 7 may be connected to the plug 1 or the tail socket 2 to use electricity. In the same product, the same effect can be achieved by employing the plug 1 or the tail socket 2 to use electricity. When the main wire 3 is shorter, the lead wires 703 may be connected to either side of the plug 1 and the tail socket 2 to use electricity. When the main wire 3 is longer, the lead wires 703 need to be powered on both the plug 1 and the tail socket 2 at the same time, so as to prevent the brightness attenuation of the LED lamp beads 3031 caused by voltage drop.

Multiple programs may be programmed in the rectifier control device 704 to achieve various lighting effects of the low-voltage wire lamp, including, but not limited to, flashing, breathing, colorful and other effects.

Figure 7:
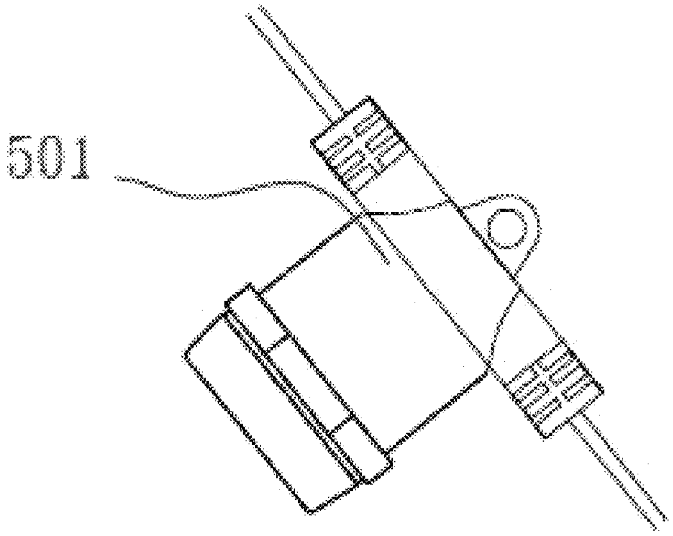
FIG. 7 is a schematic diagram showing the connection of an injection-molded lamp base which is a flat-head lamp base according to the present disclosure.
Figure 8:
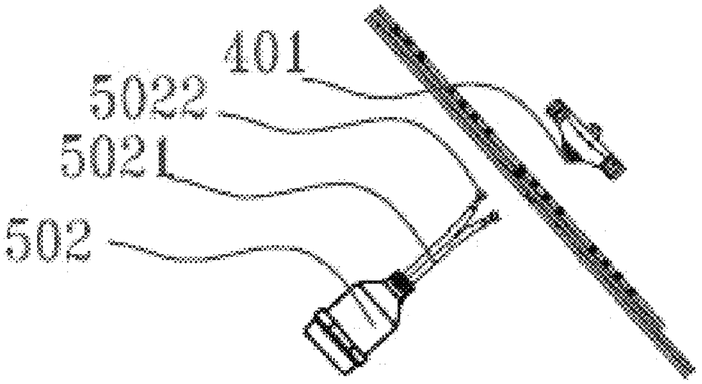
FIG. 8 is a schematic diagram showing the connection of an injection-molded lamp base which is a lamp base with an overhang line according to the present disclosure.

As shown in FIG. 7 and FIG. 8, the injection-molded lamp bases 5 may be divided into flat-head lamp bases 501 and lamp bases 502 with overhang lines. Each of the lamp bases with the overhang lines is composed of suspension wires 5021, riveted terminals 5022, a lamp holder, and a PVC rubber mass. One end of the suspension wires 5021 are connected to the lamp holder, and the other end thereof are connected to the high-voltage positive pole core wire 301 and the high-voltage negative pole core wire 302 in the main wire 3 by way of the respective riveted terminals 5022, so that the lamp base is powered on.

The light bulbs 6 are installed on the lamp bases 5, and finally, the high-voltage AC light bulbs 6 and the low-voltage wire lamp 303 in the wire 3 are simultaneously lighted up for emitting light.

The tail socket 2 can still output 120V AC voltage after being powered on, so as to facilitate the subsequent series connection with other light strings. According to the present disclosure, each of light strings of the low-voltage wire lamp is independently powered, thus preventing the phenomenon of severer light attenuation of the first light bulb caused by line loss and voltage drop due to the length problem.

The low-voltage wire lamp 303 can achieve a flashing or breathing light effect under the control of the rectifier control device 704.

The above provides an exemplary description of the present disclosure in conjunction with the accompanying drawings. It is evident that the implementation of the present disclosure is not limited by the aforementioned manner. As long as various improvements are made based on the method concept and technical solution of the present disclosure, or if the concept and technical solution of the present disclosure are directly applied to other occasions without improvement, they all fall within the scope of protection of the present disclosure.

The invention claimed is:

1. An LED-embedded light-emitting wire light string, comprising a plug (1), a tail socket (2), a main wire (3), tees (4), injection-molded lamp bases (5), light bulbs (6), and a rectifier drive board (7), wherein two ends of the main wire (3) are respectively connected to the plug (1) and the tail socket (2); a plurality of branches are provided on the main wire (3), each of the branches is connected to one of the injection-molded lamp bases (5) by way of the corresponding tee unit (4), the light bulbs (6) are respectively installed on the injection-molded lamp bases (5), and the main wire (3) also connects a plurality of light bulbs (6) in series to form a high-voltage wire lamp; a plurality of LED lamp beads (3031) are connected in series on the main wire (3) so as to form a low-voltage wire lamp (303); the low-voltage wire lamp (303) is connected to the plug (1) or the tail socket (2) by way of the rectifier drive board (7); and the high-voltage wire lamp and the low-voltage wire lamp (303) share a power supply, wherein the main wire (3) is composed of a high-voltage positive pole core wire (301), a high-voltage negative pole core wire (302), the low-voltage wire lamp (303), a light-transmitting film (304), and a sheath layer (305); the high-voltage positive pole core wire (301), the high-voltage negative pole core wire (302), and the low-voltage wire lamp (303) are twisted into a stranded wire body (306), and the light-transmitting film (304) is wound around an outside of the stranded wire body (306); and the light-transmitting film (304) can reflect and refract light for a plurality of times during a propagation process of light, thereby achieving an effect of diffuse reflection and making a light emitted by a wire more uniform.

2. The LED-embedded light-emitting wire light string according to claim 1, wherein the low-voltage wire lamp (303) is composed of two conductor wires (3032) and a plurality of LED lamp beads (3031) connected to the two conductor wires (3032); and the LED lamp beads (3031) are fixed on the two conductor wires (3032) by welding, and a dispensing sticker layer (3033) is applied to an outer surface of each of the LED lamp beads (3031), thereby making the LED lamp beads (3031) completely sealed, so as to achieve a waterproof effect.

3. The LED-embedded light-emitting wire light string according to claim 2, wherein the low-voltage wire lamp (303) is a leather wire lamp or a copper wire lamp, and a light emitted by the low-voltage wire lamp (303) is monochromatic or chromatic.

4. The LED-embedded light-emitting wire light string according to claim 3, wherein the rectifier drive board (7) is provided with two input solder joints (701), two output solder joints (702), two lead wires (703), and the rectifier control device (704), wherein one end of each of the lead wires (703) is welded to one of the input solder joints (701) on the rectifier drive board (7), and the other end thereof is connected to the plug (1) or the tail socket (2) to use electricity; and each of the output solder joints (702) is connected to one of the conductor wires (3032) of the low-voltage wire lamp, so as to supply power to the low-voltage wire lamp (303).

5. The LED-embedded light-emitting wire light string according to claim 4, wherein the plug (1) is composed of inserts (101), a plug inner frame (102), and rubber masses (103), wherein two insert riveting ports are respectively reserved at tail parts of the inserts (101) for connecting the main wire (3); one of the insert riveting ports allows one of the lead wires (703) to be tightly connected to the high-voltage negative pole core wire (302) and the plug by way of punched riveting, and the other insert riveting port enables the other lead wire (703), the high-voltage positive pole core wire (301) and the plug to be tightly connected by way of punched riveting;

and/or, the tail socket (2) is composed of a tail socket inner frame (201), a tail socket terminal (202), and PVC rubber masses (203); two riveting ports (2021) are respectively reserved at a tail end of the tail socket terminal (202) for connecting the main wire (3); and one of the riveting ports (2021) allows one of the lead wires (703) to be tightly connected to the high-voltage negative pole core wire (302) and the tail socket by way of punched riveting, and the other riveting port enables the other lead wire (703), the high-voltage positive pole core wire (301) and the tail socket to be tightly connected by way of punched riveting.

6. The LED-embedded light-emitting wire light string according to claim 5, wherein the injection-molded lamp bases (5) are flat-head lamp bases (501); and alternatively, the injection-molded lamp bases (5) are lamp bases (502) with overhang lines, each of the lamp bases (502) with overhang lines is composed of two suspension wires (5021), riveted terminals (5022), a lamp holder, and a PVC rubber mass, wherein one end of one of the suspension wires (5021) is connected to the lamp holder, and the other end thereof is connected to the high-voltage positive pole core wire (301) in the main wire (3) by way of the respective riveted terminal (5022); one end of the other suspension wire (5021) is connected to the lamp holder, and the other end thereof is connected to the high-voltage negative pole core wire (302) in the main line (3) by way of the respective riveted terminal (5022), so that the lamp base is powered on.

7. The LED-embedded light-emitting wire light string according to claim 5, wherein the tail socket (2) can output 120V AC voltage after being powered on, so as to facilitate a subsequent series connection with other light strings.

8. The LED-embedded light-emitting wire light string according to claim 5, wherein the light bulbs (6) in the high-voltage wire lamp and the low-voltage wire lamp (303) in the wire (3) can be simultaneously lighted up for emitting light.

9. The LED-embedded light-emitting wire light string according to claim 4, wherein the tail socket (2) can output 120V AC voltage after being powered on, so as to facilitate a subsequent series connection with other light strings.

10. The LED-embedded light-emitting wire light string according to claim 4, wherein the light bulbs (6) in the high-voltage wire lamp and the low-voltage wire lamp (303) in the wire (3) can be simultaneously lighted up for emitting light.

11. The LED-embedded light-emitting wire light string according to claim 2, wherein the low-voltage wire lamp (303) achieves a flashing or breathing light effect under a control of a rectifier control device (704).

12. The LED-embedded light-emitting wire light string according to claim 11, wherein the rectifier drive board (7) is provided with two input solder joints (701), two output solder joints (702), two lead wires (703), and the rectifier control device (704), wherein one end of each of the lead wires (703) is welded to one of the input solder joints (701) on the rectifier drive board (7), and the other end thereof is connected to the plug (1) or the tail socket (2) to use electricity; and each of the output solder joints (702) is connected to one of the conductor wires (3032) of the low-voltage wire lamp, so as to supply power to the low-voltage wire lamp (303).

13. The LED-embedded light-emitting wire light string according to claim 12, wherein the plug (1) is composed of inserts (101), a plug inner frame (102), and rubber masses (103), wherein two insert riveting ports are respectively reserved at tail parts of the inserts (101) for connecting the main wire (3); one of the insert riveting ports allows one of the lead wires (703) to be tightly connected to the high-voltage negative pole core wire (302) and the plug by way of punched riveting, and the other insert riveting port enables the other lead wire (703), the high-voltage positive pole core wire (301) and the plug to be tightly connected by way of punched riveting;

and/or, the tail socket (2) is composed of a tail socket inner frame (201), a tail socket terminal (202), and PVC rubber masses (203); two riveting ports (2021) are respectively reserved at a tail end of the tail socket terminal (202) for connecting the main wire (3); and one of the riveting ports (2021) allows one of the lead wires (703) to be tightly connected to the high-voltage negative pole core wire (302) and the tail socket by way of punched riveting, and the other riveting port enables the other lead wire (703), the high-voltage positive pole core wire (301) and the tail socket to be tightly connected by way of punched riveting.

14. The LED-embedded light-emitting wire light string according to claim 13, wherein the injection-molded lamp bases (5) are flat-head lamp bases (501); and alternatively, the injection-molded lamp bases (5) are lamp bases (502) with overhang lines, each of the lamp bases (502) with overhang lines is composed of two suspension wires (5021), riveted terminals (5022), a lamp holder, and a PVC rubber mass, wherein one end of one of the suspension wires (5021) is connected to the lamp holder, and the other end thereof is connected to the high-voltage positive pole core wire (301) in the main wire (3) by way of the respective riveted terminal (5022); one end of the other suspension wire (5021) is connected to the lamp holder, and the other end thereof is connected to the high-voltage negative pole core wire (302) in the main line (3) by way of the respective riveted terminal (5022), so that the lamp base is powered on.

15. The LED-embedded light-emitting wire light string according to claim 13, wherein the tail socket (2) can output 120V AC voltage after being powered on, so as to facilitate a subsequent series connection with other light strings.

16. The LED-embedded light-emitting wire light string according to claim 13, wherein the light bulbs (6) in the high-voltage wire lamp and the low-voltage wire lamp (303) in the wire (3) can be simultaneously lighted up for emitting light.

17. The LED-embedded light-emitting wire light string according to claim 12, wherein the tail socket (2) can output 120V AC voltage after being powered on, so as to facilitate a subsequent series connection with other light strings.

18. The LED-embedded light-emitting wire light string according to claim 12, wherein the light bulbs (6) in the high-voltage wire lamp and the low-voltage wire lamp (303) in the wire (3) can be simultaneously lighted up for emitting light.

* * * * *